(12) United States Patent
Vega et al.

(10) Patent No.: US 7,685,635 B2
(45) Date of Patent: Mar. 23, 2010

(54) SYSTEMS AND METHODS FOR MULTI-LEVEL INTERCEPT PROCESSING IN A VIRTUAL MACHINE ENVIRONMENT

(75) Inventors: Rene Antonio Vega, Kirkland, WA (US); Eric P. Traut, Bellevue, WA (US); Joy Ganguly, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1142 days.

(21) Appl. No.: 11/078,141

(22) Filed: Mar. 11, 2005

(65) Prior Publication Data

US 2006/0206892 A1    Sep. 14, 2006

(51) Int. Cl.
*G06F 7/04* (2006.01)

(52) U.S. Cl. .............................. 726/17; 718/1; 718/100

(58) Field of Classification Search .................... 726/17; 718/1
See application file for complete search history.

(56) References Cited

U.S. PATENT DOCUMENTS

| | | | |
|---|---|---|---|
| 4,253,145 A * | 2/1981 | Goldberg | 703/21 |
| 4,787,031 A | 11/1988 | Karger et al. | 364/200 |
| 2003/0009648 A1 | 1/2003 | Doing et al. | 711/202 |
| 2003/0037089 A1 | 2/2003 | Cota-Robles et al. | 709/1 |
| 2003/0061254 A1 | 3/2003 | Lindwer et al. | 709/1 |
| 2005/0044301 A1 | 2/2005 | Vasilevsky et al. | 711/1 |
| 2005/0076324 A1 | 4/2005 | Lowell et al. | 717/100 |
| 2005/0091022 A1 | 4/2005 | Levit-Gurevich et al. | 703/13 |
| 2005/0091029 A1 | 4/2005 | Traut | 703/27 |
| 2006/0242641 A1 * | 10/2006 | Kinsey et al. | 718/1 |

FOREIGN PATENT DOCUMENTS

| WO | WO 03/052542 A1 | 1/2003 |
|---|---|---|
| WO | WO 2005/036806 A2 | 4/2005 |

OTHER PUBLICATIONS

Barham et al., "-Xen and the Art of Virtulization," Proceedings of the ACM Symposium on Operating Systems Principles, 2003, XP002298786, 164-177.

(Continued)

*Primary Examiner*—Jung Kim
*Assistant Examiner*—Samson B Lemma
(74) *Attorney, Agent, or Firm*—Woodcock Washburn LLP

(57) ABSTRACT

Various embodiments of the present invention are directed to a multi-level virtualizer that is designed to remove much of the intercept-related functionality from the base-level virtualizer (that exists outside of each partition) and, instead, incorporate much of this functionality directly into each partition. For several of the embodiments, certain intercept handling functions are performed by an "external monitor" that runs within a partition and responds to specific intercept events, and the base-level virtualizer installs these external monitors within each partition and thereafter manages the external monitors for both single-partition and cross-partition intercept events. This distributed approach to intercept handling allows for a much less complex virtualizer and moves the intercept functionality up into each partition where each external monitor uses the resources of the corresponding guest operating system in that partition to resolve the intercept event.

19 Claims, 7 Drawing Sheets

OTHER PUBLICATIONS

Barham et al., "Xen 2002," Technical Report- University of Cambridge Computer Laboratory, No. UCAM-CL-TR-553, 2003, XP002355082, 1-15.

The Xen Team, "Xen Users' Manual," Xen User's Manual, Xen Team University of Cambridge, 2004, XP002375304, 1-50.

IBM, "Virtual machine manager, integrated physical and virtual systems management" http://www-1.ibm.com/servers/eserver/xseries/systems_management/xseries_sm/vmm.html, 2 pages.

Intel Research Cambridge, "Xen and the art of virtual channel processing," http://www.intel.com/research/network/cambridge_collab_p2.htm#xen, 5 pages.

Trango, "The real-time embedded hypervisor; Products (features)," http://www.trango-systems.com/english/frameset_en.html, 1 page.

VMware VirtualCenter1.2, "What is VMware VirtualCenter?," http://www.vmware.com/products/vmanage/vc_features.html, 2 pages.

* cited by examiner

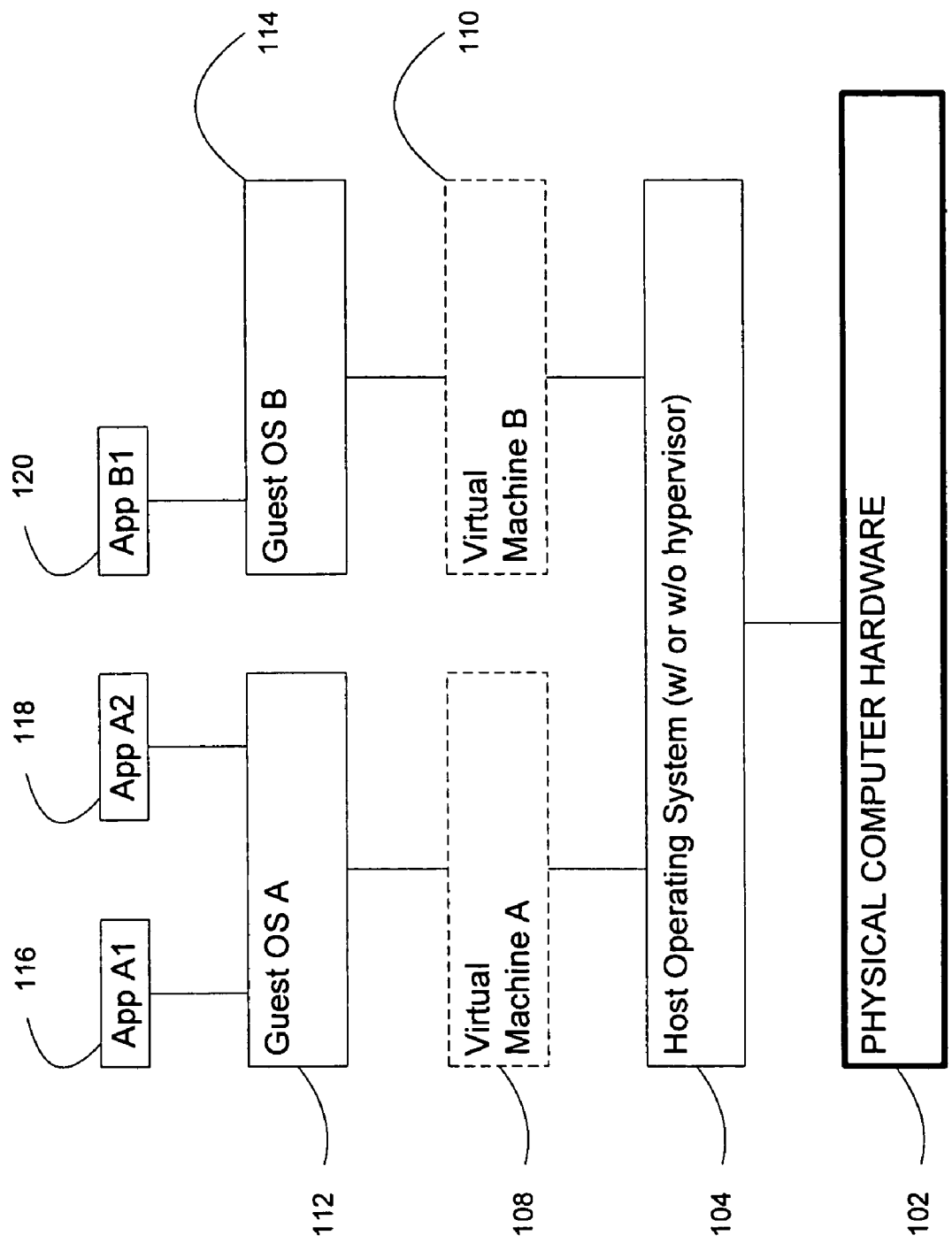

SYSTEMS AND METHODS FOR MULTI-LEVEL INTERCEPT PROCESSING IN A VIRTUAL MACHINE ENVIRONMENT

FIELD OF THE INVENTION

The present invention generally relates to the field of virtual machines (also known as "processor virtualizations") and, more specifically, the present invention is directed to an multi-level external virtual machine monitor (VMM) where certain intercept handling functions are performed by an external monitors running in specific partitions (each an instance of a virtual machine or "VM") in conjunction with a base-level VMM that manages these partitioned external monitors.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Processor Virtualization

Computer manufacturers want to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus the host computer can both run software design for its own hardware architecture and software written for computers having an unrelated hardware architecture. As a more specific example, a computer system manufactured by Apple Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a "virtual machine" as the guest computer system only exists in the host computer system as a pure software representation of the operation of one specific hardware architecture. The terms emulator, virtual machine, and processor emulation are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest. computer system.

The emulator program acts as the interchange between the hardware architecture of the host machine and the instructions transmitted by the software running within the emulated environment. This emulated environment might be created by a virtual machine monitor (VMM) which is a software layer that runs directly above the hardware and which virtualizes all the resources of the machine by exposing interfaces that are the same as the hardware the VMM is virtualizing (which enables the VMM to go unnoticed by operating system layers running above it). In this configuration a host operating system (HOS) and a VMM may run side-by-side on the same physical hardware. Alternately, the emulator program may be the HOS itself running directly on the physical computer hardware and emulating another hardware configuration. In a specific implementation of this embodiment, the HOS software may specifically comprise one embodiment of a "hypervisor."

A hypervisor is a control program that exists near the kernel level of a HOS and operates to allow one or more secondary operating systems, other than the HOS, to use the hardware of the computer system, including the physical processor(s) of the computer system. A hypervisor emulates the operating environment for the secondary operating system so that the secondary operating system believes that it is operating in its customary hardware and/or operating system environment and that it is in logical control of the computer system, even though it may in fact be operating in another hardware and/or operating system environment and that the HOS may be in logical control of the computer system. This is significant because many operating systems function such that the operating system must operate as though it is in exclusive logical control of the hardware of the computer system. Thus, for multiple operating systems to function simultaneously on a single computer system, the hypervisor of each operating system must function to mask the presence of the other operating systems such that each operating system functions as though it has exclusive control over the entire computer system.

For simplicity, processor virtualization programs, including but not limited to VMMs and hypervisors, are collectively referred to herein as "virtualizers." Moreover, any aspect of the inventions disclosed herein in the context of a hypervisor are also presumed to be equally valid and disclosed for a VMM and other virtualizers and vice versa.

Intercepts and Monitors

As known and appreciated by those of skill in the art, a major function of a virtualizer (e.g., a hypervisor or VMM) is to intercept events that occur while software is executing on a guest operating system in a partition (an individual instance of a VM). In this context, an event is interaction that occurs between some component of the partition and some resource, physical or virtual, that is not in fact part of the partition. For example, a program executing in a first partition may want to send data to a certain peripheral device, where the operating system for that partition believes that it has exclusive control over said device. However, in this case, when the program sends its data through the guest operating system for its partition and the guest operating system attempts to communicate with the peripheral device, the virtualizer intercepts this communication and for managing this partitions access to said device along with other attempts by other partitions to do the same—that is, where the device is not in fact dedicated to any particular partition. By intercepting these kinds of events, the virtualizer essentially fools the guest OS into thinking that it owns all of the resources of the machine (like an OS executing on physical hardware typically does) when, in reality, the underlying physical resources are in fact being shared or partitioned among several virtual machine partitions. In this regard, the virtualizer is responsible for both intercepting such events and responding to the intercepts when they occur. Unfortunately, centralizing this kind of functionality in a single virtualizer operating outside of each partition requires the virtualizer to be quite complex when, for reasons readily apparent to skilled artisans, a more simple virtualizer is desirable. Therefore, what is needed in the art for a simpler virtualizer-intercept model that would still provide intercept functionality. The present invention provides one such solution.

SUMMARY OF THE INVENTION

Various embodiments of the present invention are directed to a multi-level virtualizer that is designed to remove much of the intercept-related functionality from the base-level virtualizer (that exists outside of each partition) and, instead, incorporate much of this functionality directly into each partition. For several of the embodiments, certain intercept handling functions are performed by an "external monitor" that runs within a partition and responds to specific intercept events, and the base-level virtualizer installs these external monitors within each partition and thereafter manages the external monitors for both single-partition and cross-partition intercept events. This distributed approach to intercept handling allows for a much less complex virtualizer and moves the intercept functionality up into each partition where each external monitor uses the resources of the corresponding guest operating system in that partition to resolve the intercept event.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3A illustrates a virtualized computing system wherein the emulation is performed by the host operating system (either directly or via a hypervisor);

DETAILED DESCRIPTION OF ILLUSTRATIVE EMBODIMENTS

The inventive subject matter is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
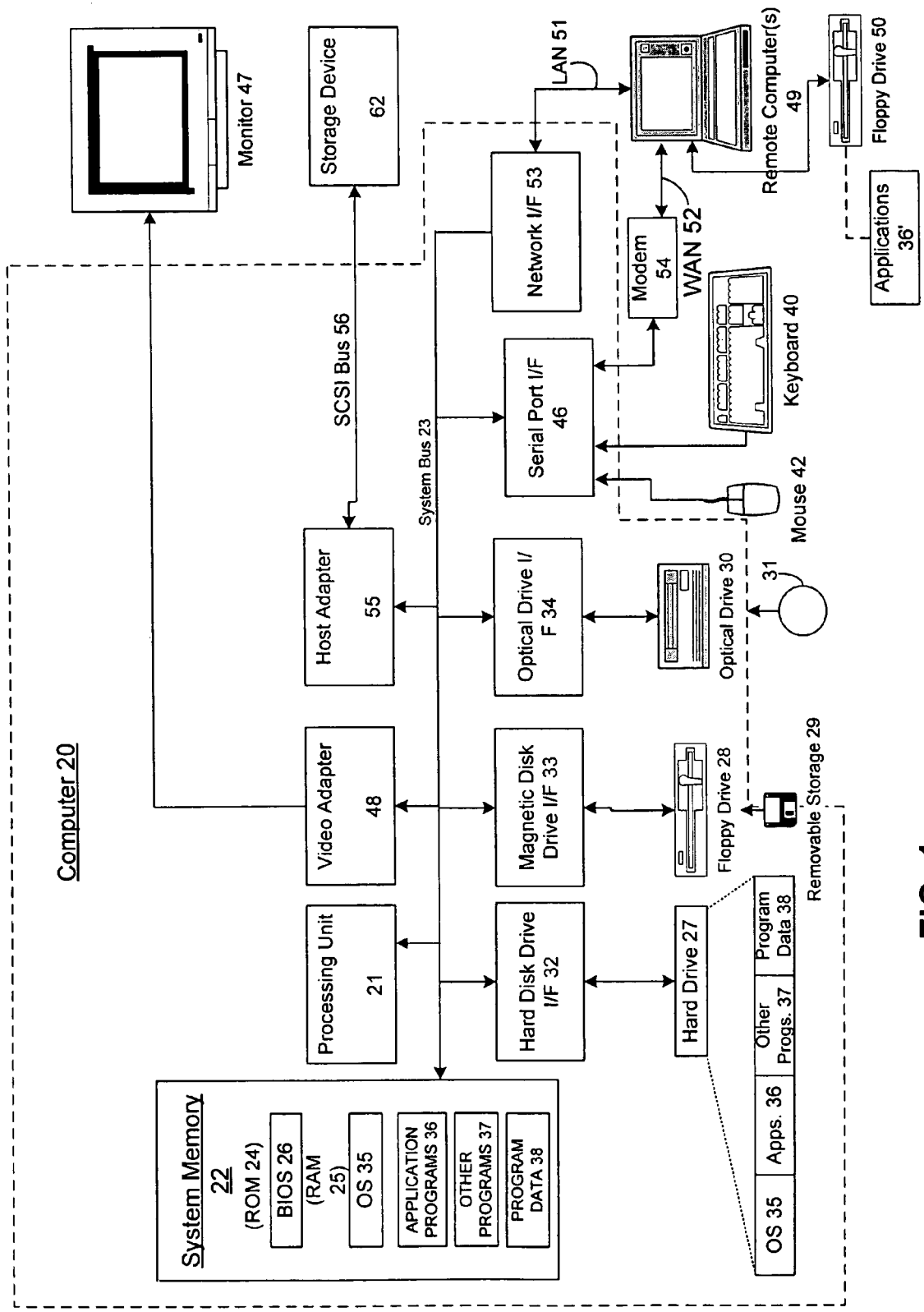
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well-suited for computerized systems, nothing in this document is intended to limit the invention to such embodiments.

Virtual Machines

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system."

Figure 2:
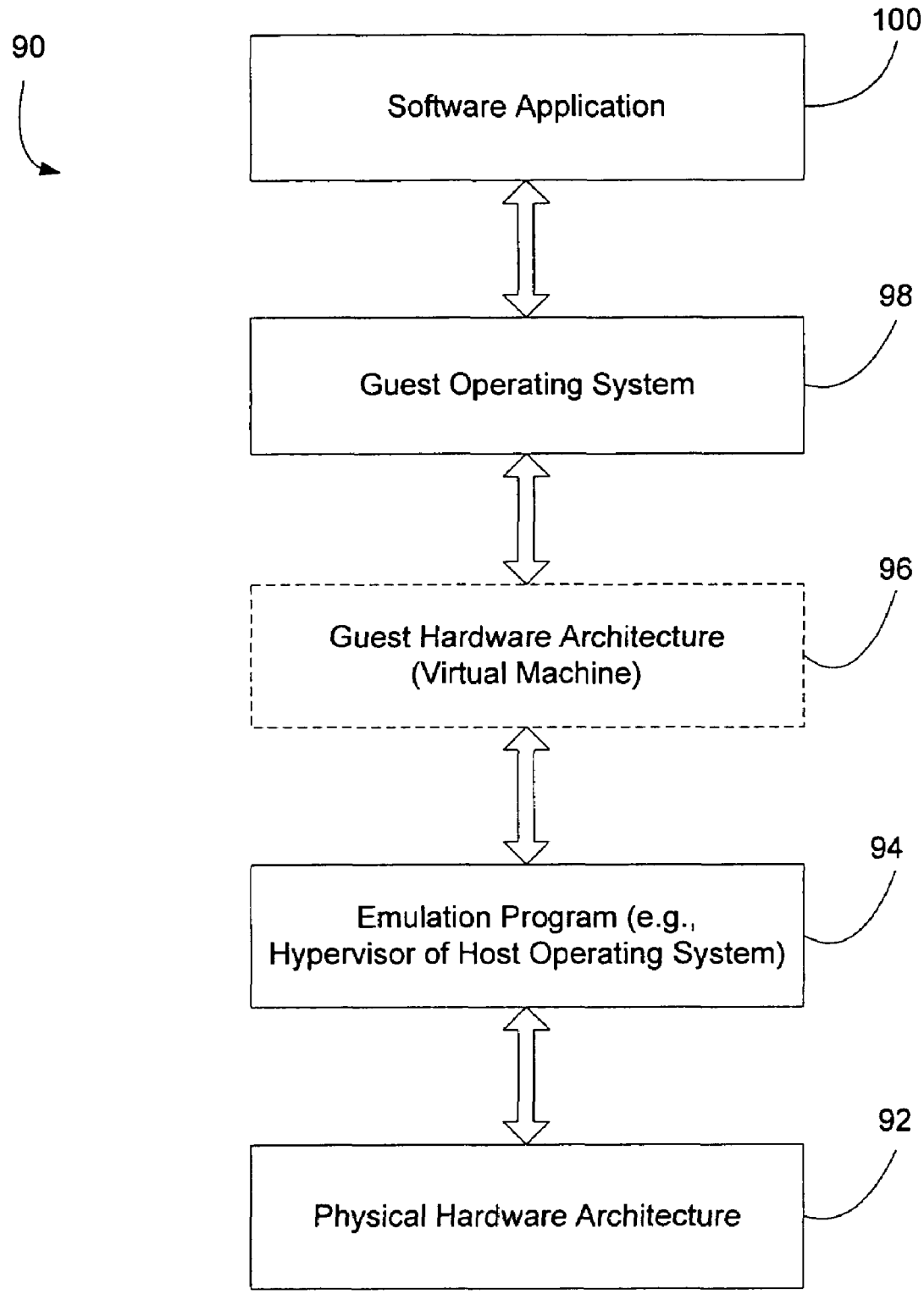
FIG. 2 illustrates the logical layering of the hardware and software architecture for an emulated operating environment in a computer system.

FIG. 2 is a diagram representing the logical layering of the hardware and software architecture for an emulated operating environment in a computer system. In the figure, an emulation program 94 runs directly or indirectly on the physical hardware architecture 92. Emulation program 94 may be (a) a virtual machine monitor that runs alongside a host operating system, (b) a specialized host operating system having native emulation capabilities, or (c) a host operating system with a hypervisor component wherein said hypervisor component performs said emulation. Emulation program 94 emulates a guest hardware architecture 96 (shown as a broken line to illustrate the fact that this component is the "virtual machine," that is, hardware that does not actually exist but is instead emulated by said emulation program 94). A guest operating system 98 executes on said guest hardware architecture 96, and software application 100 runs on the guest operating system 98. In the emulated operating environment of FIG. 2—and because of the operation of emulation program 94—software application 100 can run in computer system 90 even though software application 100 is designed to run on an operating system that is generally incompatible with the host operating system and hardware architecture 92.

FIG. 3A illustrates a virtualized computing system comprising a host operating system software layer 104 running directly above physical computer hardware 102 where the host operating system (host OS) 104 provides access to the resources of the physical computer hardware 102 by exposing interfaces that are the same as the hardware the host OS is emulating (or "virtualizing")—which, in turn, enables the host OS to go unnoticed by operating system layers running above it. To perform the emulation, the host operating system 102 may be a specially designed operating system with native emulations capabilities or, alternately, it may be a standard operating system with an incorporated hypervisor component for performing the emulation.

Referring again to FIG. 3A, above the host OS 104 are two virtual machine (VM) implementations, VM A 108, which may be, for example, a virtualized Intel 386 processor, and VM B 110, which may be, for example, a virtualized version of one of the Motorola 680X0 family of processors. Above each VM 108 and 110 are guest operating systems (guest OSs) A 112 and B 114 respectively. Running above guest OS A 112 are two applications, application A1 116 and application A2 118, and running above guest OS B 114 is application B1 120.

In regard to FIG. 3A, it is important to note that VM A 108 and VM B 110 (which are shown in broken lines) are virtualized computer hardware representations that exist only as software constructs and which are made possible due to the presence of specialized software code that not only presents VM A 108 and VM B 110 to Guest OS A 112 and Guest OS B 114 respectively, but which also performs all of the software steps necessary for Guest OS A 112 and Guest OS B 114 to indirectly interact with the real physical computer hardware 102.

Figure 3B:
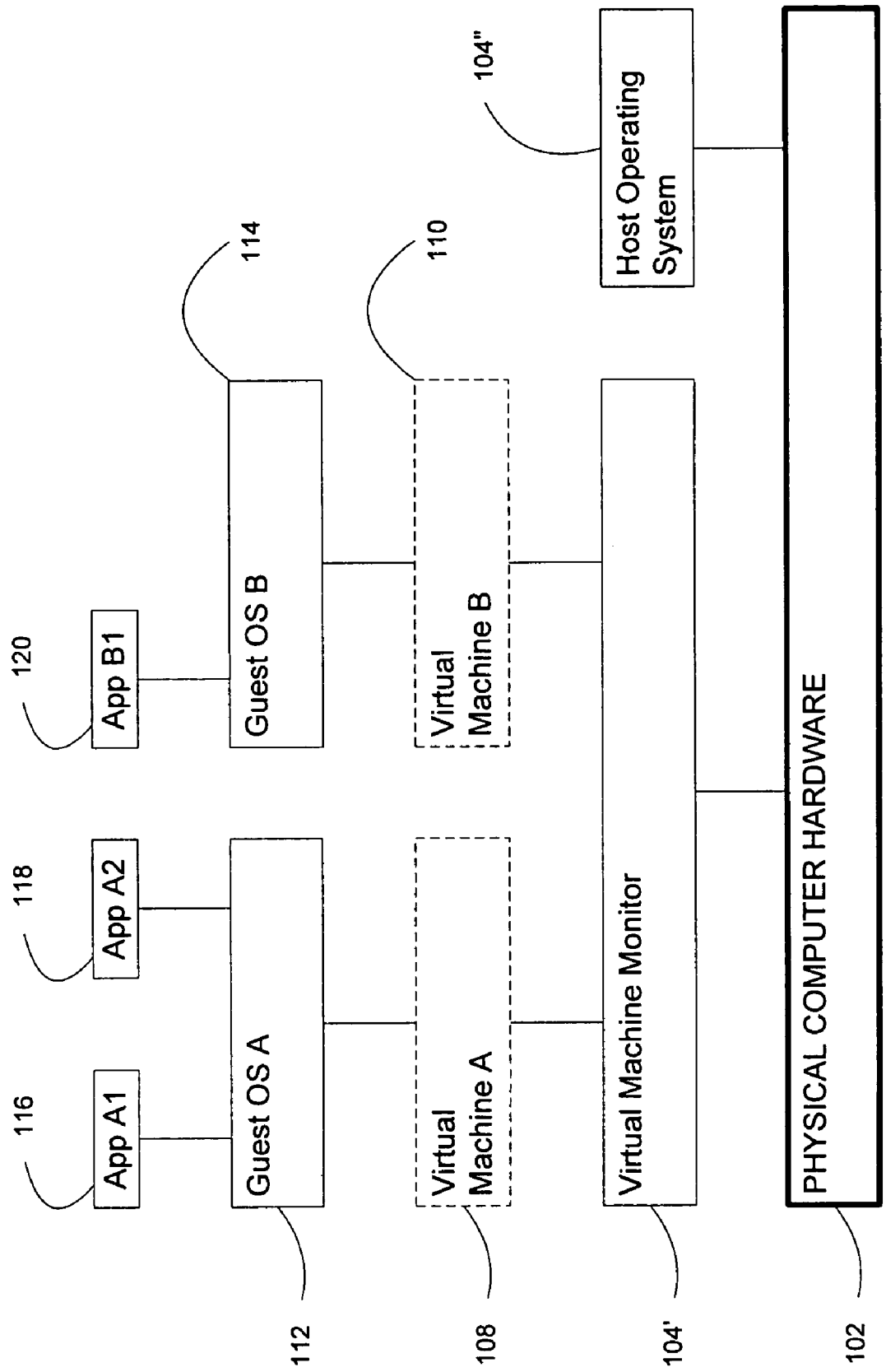
FIG. 3B illustrates an alternative virtualized computing system wherein the emulation is performed by a virtual machine monitor running side-by-side with a host operating system.

FIG. 3B illustrates an alternative virtualized computing system wherein the emulation is performed by a virtual machine monitor (VMM) 104' running alongside the host operating system 104". For certain embodiments the VMM may be an application running above the host operating system 104 and interacting with the computer hardware only through said host operating system 104. In other embodiments, and as shown in FIG. 3B, the VMM may instead comprise a partially independent software system that on some levels interacts indirectly with the computer hardware 102 via the host operating system 104 but on other levels the VMM interacts directly with the computer hardware 102 (similar to the way the host operating system interacts directly with the computer hardware). And in yet other embodiments, the VMM may comprise a fully independent software system that on all levels interacts directly with the computer hardware 102 (similar to the way the host operating system interacts directly with the computer hardware) without utilizing the host operating system 104 (although still interacting with said host operating system 104 insofar as coordinating use of said computer hardware 102 and avoiding conflicts and the like).

All of these variations for implementing the VMM are anticipated to form alternative embodiments of the present invention as described herein, and nothing herein should be interpreted as limiting the invention to any particular VMM configuration. In addition, any reference to interaction between applications 116, 118, and 120 via VM A 108 and/or VM B 110 respectively (presumably in a hardware emulation scenario) should be interpreted to be in fact an interaction between the applications 116, 118, and 120 and a VMM. Likewise, any reference to interaction between applications VM A 108 and/or VM B 110 with the host operating system 104 and/or the computer hardware 102 (presumably to execute computer instructions directly or indirectly on the computer hardware 102) should be interpreted to be in fact an interaction between the VMM and the host operating system 104 or the computer hardware 102 as appropriate.

Overview of Event Intercepts

As discussed earlier herein, a virtualizer is a thin layer of software that runs on a computer system and allows for the creation of one or more abstract virtual machine (VM) instances (each also referred to as a partition). Each of these instances typically acts like a real computer with its own memory, processor(s), and I/O devices which may correspond to actual physical resources or to virtualized resources that do not in fact exist in any physical sense. To perform the virtualization, most virtualizers need to intercept specific events that occur while guest software executes in the partitions. (Guest software is software running within a specific virtual machine and typically consists of an operating system and one or more applications.) Intercepting specific events is key to virtualization because it enables the virtualizer to fool the guest into thinking that it owns all of the resources on the physical machine when, in reality, these resources are being shared or partitioned (i.e. subdivided and assigned to specific virtual machines). For example, consider a computer system having four processors and a register that reports the total number of processors, as well as four virtual machines (partitions) running on the system where each has been assigned to a single processor. In this instance, when guest software for each of these virtual machines reads the "number of processors" register, they would normally read the value "4" (which is, in fact, the total number of physical processors and thus the value in the physical register). However, in this case, the virtualizer needs to fool each guest OS into believing that it is running on a one-processor system. To accomplish this, the virtualizer configures the virtual processors for each virtual machine (partition) to generate an "intercept" event when the guest reads from the "number of processors" register. This intercept prevents the VMs from directly reading the register and causes control to be transferred from the guest to the virtualizer. The virtualizer is then able to override the normal value of "4" actually present in the register with the value it wants to report—which, in this case, is "1".

As well-known and readily-appreciated by those of skill in the art, in general intercepts can be divided into two categories: processor intercepts and memory intercepts. Processor intercepts are events that are tied to specific processor instructions, registers, exceptions or interrupts. Memory intercepts are specific to actions that cause the processor to read from or write to specified memory locations, including explicit accesses—e.g., a "MOVE" instruction that reads from memory—or implicit accesses—e.g., a reference generated by the processor as it walks the page tables in response to a TLB (translation look-aside buffer) miss.

Traditionally, the virtualizer (existing outside of each partition) is responsible for both "installing" an intercept and "responding" to the intercept when it occurs. Techniques for installing intercepts are highly dependent on the processor architecture in question. Most processors provide a way to "trap" on certain events. In some cases, control over intercepts can be fine-grained or coarse-grained. If the latter, the virtualizer may need to install a single coarse-grained intercept and then "filter out" the specific events it wants to intercept and ignore the other intercept events. If the processor provides fine-grained control over specific intercept types, the virtualizer can request only those intercepts that it wants. Ideally, an intercept should only occur when the virtualizer needs to override the standard processor behavior because intercept reporting generally adds substantial overhead processing costs which reduce system performance. Referring again to the earlier example of the four-processor four-VM computer system, if a user configures a single four-processor virtual machine on a four-processor physical system, there is no need to intercept accesses to the "number of processors" register, so a well-written virtualizer would avoid the intercept in this case and thereby avoid the unnecessary overhead costs and performance hit.

Another technique for reducing the need for intercepts is the general idea of a "shadow register". A shadow register is a copy of a real register that is accessed when running within a virtual machine. Again referring to our earlier example, if the system implemented a shadow "number of processors" register, then processes operating outside of the virtualized environment (including the virtualizer itself) would access the register would read the real value, but for guest process running inside the virtualized environment accesses to this register would read the shadow value where the virtualizer has programmed the shadow register to report the appropriate number of processors. By programming this information up front, the virtualizer doesn't need to request an intercept on this register access but, instead, universally causes each partition to read the shadow value instead of the real value. However, while this approach avoids the costly intercept event, additional processor complexity is required (typically an additional register) and results in some reduction in flexibility (compared to a generic intercept handler which can perform arbitrary actions).

Figure 4:
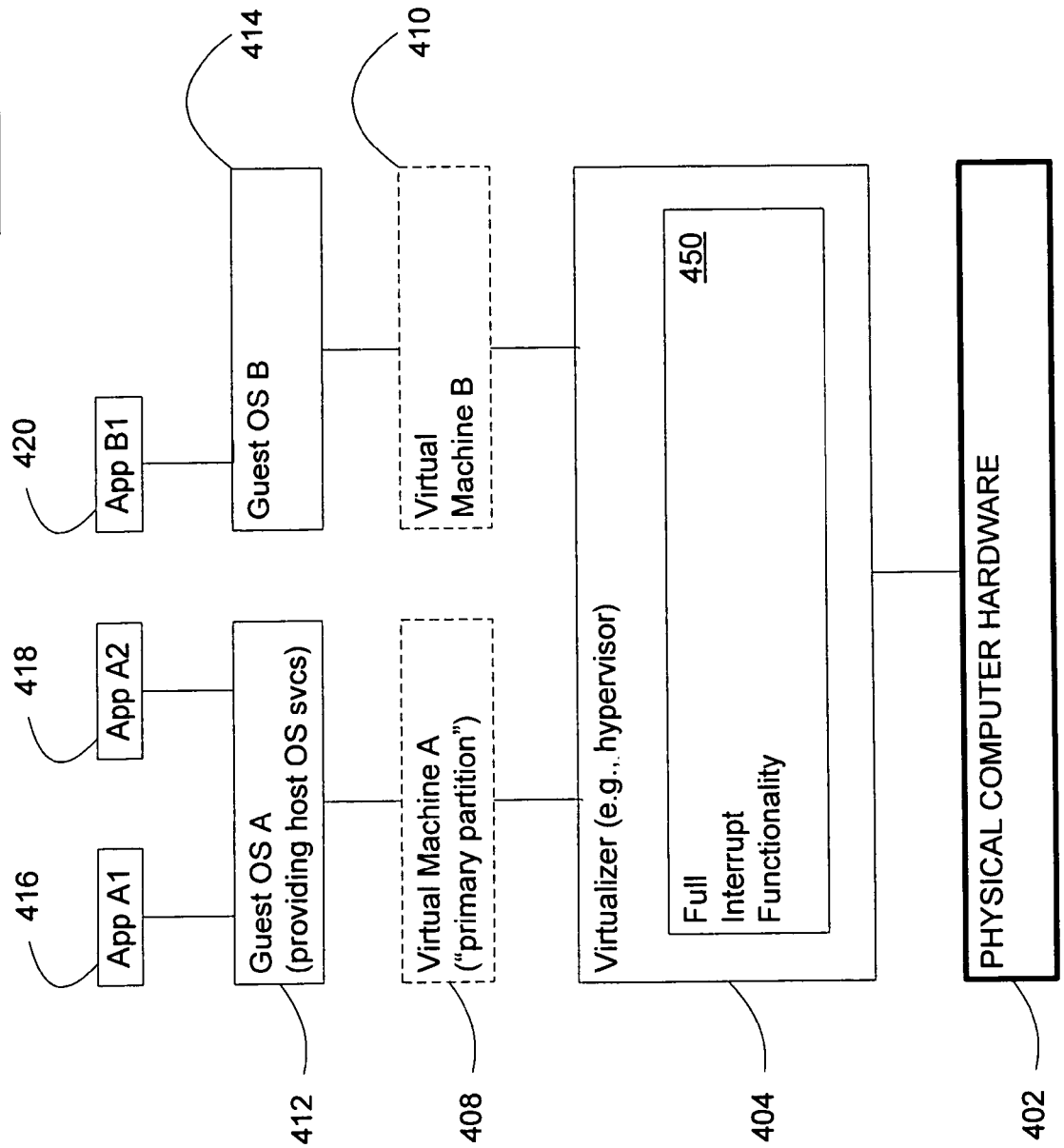
FIG. 4 is a block diagram illustrating the monolithic nature of traditional virtualizers that both install intercepts via whatever means the processor supports (e.g., exceptions, defaults, traps, etc.) and respond to all intercepted events.

More specifically, traditional virtualizers have been monolithic in nature—that is, they have been responsible for both installing intercepts and responding to intercepted events when they occur—and thus these virtualizers have heretofore been necessarily complex and cumbersome. FIG. 4 is a block diagram illustrating the monolithic nature of traditional virtualizers that both install intercepts via whatever means the processor supports (e.g., exceptions, defaults, traps, etc.) and respond to all intercepted events. In the figure, a virtualizer 404, operating above physical computer hardware 402, virtualizes two virtual machine environments, VM A 408 and VM B 410. Guest operation system (GOS) A 412 executes in VM A 408, and GOS B 414 executes in VM B 410. Software applications A1 416 and A2 418 execute in GOS A 412 on VM A 408, and software application B1 420 executes in GOS B 414 on VM B 410. In this embodiment, the virtualizer is illustrated to be a hypervisor (although other virtualizers are also anticipated and could be used), and VM A 408 is the "primary partition"—that is, the guest operating system (GOS) A of VM A is also being utilized by the hypervisor to provide functionality that might otherwise be provided by a host operating system (which, as will be appreciated by skilled artisans, is unnecessary and absent in this particular virtualization configuration).

With regard to intercepts, the virtualizer 404 (again, in this case, a hypervisor) comprises full intercept functionality 450 that greatly increases the complexity of the virtualizer 404. Thus, in this arrangement, an event in a first partition (e.g., VM A 408) triggers an intercept and causes the processor to transfer control from the guest OS running in the first partition (e.g., guest OS A 412) to the virtualizer 404. The virtualizer 404 then determines the cause of the intercept and responds to it, returning control back to the guest OS A 412 when complete.

Multi-Level Intercept Events

Various embodiments of the present invention are directed to a multi-level design for a virtualizer and methods of intercept handling that allows much of the intercept-related complexity to be moved out of the base-level virtualizer (the virtualizer component executing outside of the virtualized environment) and placed into external monitors that exist within each partition (virtual machine). In this arrangement, the base-level virtualizer (which, for certain embodiments, may be integrated into a generalized hypervisor) remains simple while some or all intercept handling is performed by one or more external monitors which run within each partition—that is, at guest level—and either in the same partition or in a partition other than the one that generated the intercept event.

Figure 5:
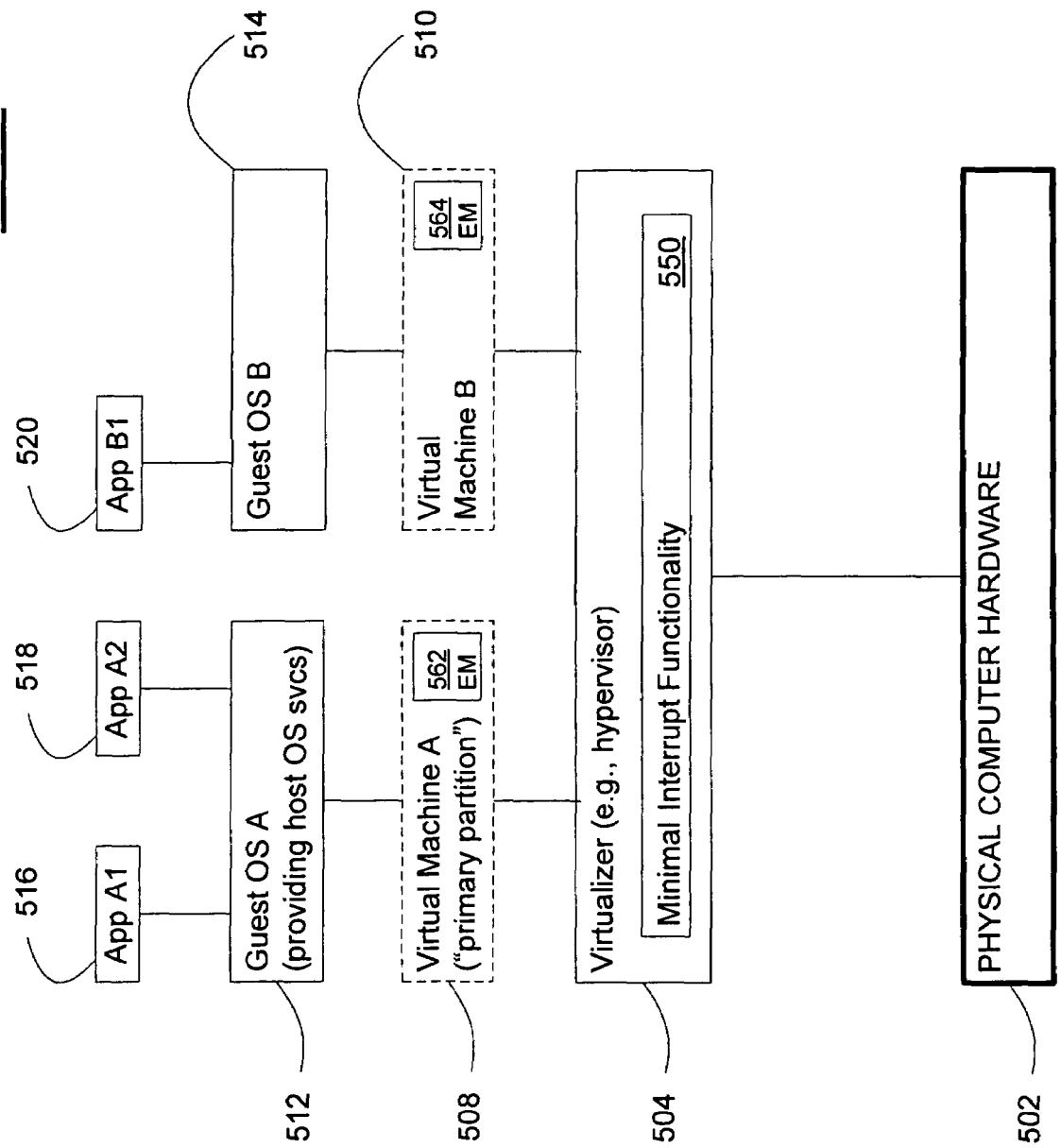
FIG. 5 is a block diagram illustrating the multi-level intercept approach for several embodiments of the present invention.

FIG. 5 is a block diagram illustrating the multi-level intercept approach for several embodiments of the present invention. In the figure, a virtualizer 504, operating above physical computer hardware 502, virtualizes two virtual machine environments, VM A 508 and VM B 510. GOS A 512 executes in VM A 508, and GOS B 514 executes in VM B 510. Software applications A1 516 and A2 518 execute in GOS A 512 on VM A 508, and software application B1 520 executes in GOS B 514 on VM B 510. In this embodiment, the virtualizer is again illustrated to be a hypervisor (although other virtualizers are also anticipated and could be used), and VM A 508 is the "primary partition"—that is, the guest operating system (GOS) A of VM A is also being utilized by the hypervisor to provide functionality that might otherwise be provided by a host operating system.

Figure 6:
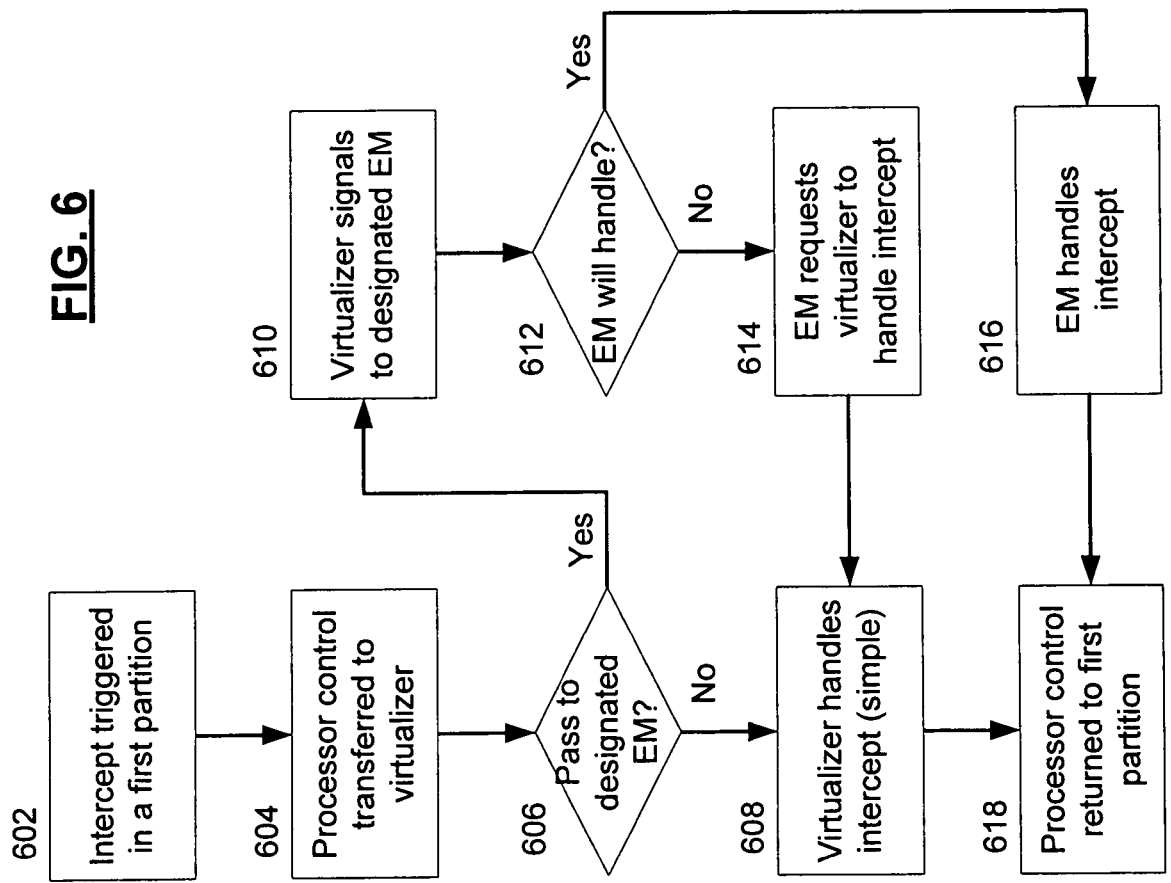
FIG. 6 is a process flow diagram illustrating the method by which a multi-level method handles intercept events.

However, with regard to intercepts, the virtualizer 504 (again, in this case, a hypervisor) comprises only minimal intercept functionality 550, and the bulk of intercept functionality is instead incorporated into one or more external monitors ("EMs") 562 and 564 in each partition 508 and 510 (shown here as incorporated into the VM virtualization of each partition, although the location of the EM relative to the VM; guest OS, and applications in a partition may vary in alternative embodiments):

In this arrangement—and referring to both FIG. 5 and FIG. 6, the latter of which is a process flow diagram illustrating the method by which a multi-level method handles intercept events—at step 602 an event in a first partition (e.g., VM A 508) triggers an intercept and, at step 604, causes the processor to transfer control from the guest OS running in the first partition (e.g., guest OS A 512) to the virtualizer 504. At step 606, the virtualizer 504 then determines whether to handle the intercept using its own default (and simple) handling mechanisms or to pass the intercept to an "external monitor" (e.g., EM 462). For example, the virtualizer may choose the former (handling the intercept itself at step 608) if the source of the intercept has requested default handling or, conversely, the latter (forwarding the intercept to an EM via step 610) if, e.g., the source of the intercept has requested that the default behavior not be used. If the virtualizer is going to forward the intercept to an external monitor for handling, the virtualizer, at step 610, first signals the specific external monitor that will be handling the intercept, allowing that EM, at step 612, to respond to the intercept in one of two ways: (a) the EM returns the intercept to the virtualizer and request the virtualizer to handle the intercept in the normal, default manner at step 614

(such as when the EM is not capable of handling a particular intercept event), or (b) the EM handles the intercept (and, for certain embodiments, notifies the virtualizer that no default action by the virtualizer is necessary) at step 616. Control is returned to the source of the intercept (e.g., guest OS A 412) at step 618 when intercept handling is complete.

In implementation, external monitors can be registered with the virtualizer for each partition, for each virtual processor, for each intercept class; or, in lieu of registering, the EMs could be polled by the virtualizer when an intercept needs to be handled (that is, called in turn until one external monitor decides to handle the intercept). Certain embodiments of the present invention only allow external monitors to be registered on a per-partition basis such that all requested intercepts for a given partition will be directed at the specified external monitor. However, for other embodiments more than one partition may have alternate external monitors running in different partitions which would allow each to have a slightly different behavior (e.g. different versions of external monitors) for each partition.

For several embodiments, a partition may not be allowed to handle its own intercepts in order to prevent circular dependencies and deadlock situations. Consequently, for these embodiments each partition's external monitor needs to run within another partition. In a hypervisor-based system with a primary partition, and as will be understood by skilled artisans, this implies that at least one partition (the primary partition) cannot have an external monitor and, thus, the primary partition for such embodiments can only rely on the default intercept handling provided by the virtualizer (the hypervisor). On the other hand, for certain alternative embodiments for a hosted system (having a host operating system), external monitors can run within the host OS and all partitions because the same concerns regarding circular dependencies and deadlock situations do not apply to an actual host operating system.

Alternative Embodiments

As mentioned earlier herein, intercepts can be divided into two classes, memory intercepts and processor intercepts. Among other things, memory intercepts are used to virtualize areas of memory that do not act like normal RAM, such as memory-mapped registers, ROM, and planar VRAM and may be used for the following, though not limited to: reads (1 to 16 bytes); writes (1 to 16 bytes); locked read/modify/write logical operations AND, OR, XOR (1, 2, 4 or 8 bytes); locked read/modify/write arithmetic operations ADD, SUB (1, 2, 4 or 8 bytes); and locked compare operations XCHG, CMPX-CHG (1, 2, 4 or 8 bytes). In contrast, and among other things, processor intercepts may be used for the following: HLT, PAUSE, and CPUID instructions; accesses to control registers (CRs), debug registers (DRs), model-specific registers (MSRs); specific exceptions; external interrupts; accesses to I/O ports (IN/OUT instructions); and fatal exceptions (e.g. triple faults).

In addition, for certain embodiments of the present invention intercepts may be reported to an external monitor in the middle of a guest instruction. For example, a single instruction might access two memory addresses that have associated intercepts. In this case, both intercepts would need to be handled before the guest instruction could be completed. These intercepts are detected and handled serially and, for certain embodiments, the virtualizer is responsible for performing instruction completion. For example, the CPUID returns information about the processor in registers EAX, EDX, EBX, and ECX, and there are two ways a virtualizer could choose to report a CPUID intercept to an external monitor: (a) the external monitor completes the CPUID instruction, writing values back to the appropriate registers and incrementing the EIP (the instruction pointer) past the CPUID instruction; or the external monitor returns the values it wants the CPUID instruction to provide. In the former instance, the virtualizer is delivering an inter-instruction intercept. From the perspective of the external monitor, the virtualized processor has not yet executed the CPUID instruction, and when the external monitor is done handling the intercept, execution of the CPUID instruction will be complete. In the latter instance, on the other hand, the virtualizer is responsible for writing these values back to the appropriate registers and incrementing the EIP past the end of the CPUID instruction. This method results in a simpler external monitor and better performance when the virtualizer is delivering a mid-instruction intercept and, from the perspective of the external monitor, the virtualized processor has started to execute the CPUID instruction. When the external monitor is done handling the intercept, the virtualizer will complete the CPUID instruction. In addition, certain embodiments support mid-instruction intercepts wherever possible because they result in a simpler external monitor interface while also providing for inter-instruction intercepts, such as intercepts on exceptions and interrupts which naturally occur on instruction boundaries.

Moreover, as previously discussed, the base-level monitor defines "default" (typically simple) handling for each intercept type. For example, a CPUID instruction by default returns the same CPU information that the physical processor would normally return, and a fatal exception (e.g. triple fault on x86 architectures) by default causes the partition to be terminated. However, for several embodiments an external monitor can override the default behavior of specific intercept classes by calling the underlying virtualizer to specify which intercepts it would like to override while intercepts that are not overridden are still handled in a default manner.

Most virtualizers also allow guest software to communicate with the virtualizer through well-defined mechanisms. For certain embodiments of the present invention, this may be done through the use of synthesized MSRs (model-specific registers). By allowing an external monitor to override the behavior of these MSR accesses, external monitors can make it look like there is no virtualizer present. They can also simulate the presence of a hypervisor or VMM with a different version. This allows for recursive virtualization—i.e. a hypervisor or VMM can run within a partition that is running on top of another hypervisor or VMM. This can be useful for prototyping new versions of a hypervisor/VMM, for providing backward compatibility with older versions, or for providing compatibility with third-party implementations.

For designs involving both a base-level virtualizer and an external monitor, there is a need for a way to signal the external monitor when an intercept occurs, and optionally, pass parameters related to the intercept. Because the external monitor is running in another partition that may currently be busy executing other code, certain embodiments require an asynchronous mechanism for delivering this signal. In one implementation, this signal may be delivered as a synthetic interrupt (see the cross-referenced patent application listed earlier herein). While traditional processor interrupt mechanisms involve the execution of an interrupt handler in response to a specific interrupt source, a synthetic interrupt controller extends this mechanism and allows parameters to be passed to the interrupt handler. In the case of intercepts, the parameters indicate information about the pending intercept, and the external monitor can use this information to efficiently handle the intercept.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium or computer-readable medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

What is claimed:

1. A system for processing intercepts for partitions in a virtual machine environment, said virtual machine environment comprising a virtualizer and a partition, said system comprising:
    a processor;
    a virtualizer that intercepts an intercept event from the partition, and forwards the intercept event to an external monitor; and
    an external monitor that suspends a virtual processor corresponding to the partition, executes the intercept, modifies the state of the virtual processor to correspond to the intercept event having been executed, and resumes the virtual processor.

2. The system of claim 1 wherein said virtualizer may resolve a default intercept without forwarding said first intercept event to said first external monitor.

3. The system of claim 1 wherein said at least one intercept event is an event from among the following group of events: reads; writes; locked read/modify/write logical operations AND, OR, or XOR; locked read/modify/write arithmetic operations ADD or SUB; locked compare operations XCHG and CMPXCHG; HLT, PAUSE, or CPUID instructions; accesses to control registers (CRs), debug registers (DRs), model-specific registers (MSRs); specific exceptions; external interrupts; accesses to I/O ports; and fatal exceptions.

4. The system of claim 1 wherein said at least one intercept event is either a processor intercept type or a memory intercept type, and wherein a type of said at least one intercept is specified independently to the virtualizer by said first partition.

5. The system of claim 1 wherein a multi-level intercept system, comprising said virtualizer and said first external monitor, processes both a mid-instruction intercept and an inter-instruction intercept.

6. The system of claim 1 wherein said first partition delivers said at least one intercept to said virtualizer using a synthetic interrupt.

7. A method for processing intercepts for partitions in a virtual machine environment, said virtual machine environment comprising a virtualizer and at least one partition, comprising:
    intercepting, by the virtualizer, at least one intercept event received from the partition;
    forwarding, by the virtualizer, the at least one intercept event to an external monitor executing within the partition;
    suspending, by the external monitor, a virtual processor of the virtualizer corresponding to the partition;
    executing, by the external monitor, the at least one intercept;
    modifying, by the external monitor, a state of the virtual processor, the modified state corresponding to the at least one intercept event having been executed; and
    resuming, by the external monitor, the virtual processor.

8. The method of claim 7 wherein said virtualizer may resolve a default intercept without forwarding said first intercept event to said first external monitor.

9. The method of claim 7 wherein said at least one intercept event is an event from among the following group of events: reads; writes; locked read/modify/write logical operations AND, OR, or XOR; locked read/modify/write arithmetic operations ADD or SUB; locked compare operations XCHG and CMPXCHG; HLT, PAUSE, or CPUID instructions; accesses to control registers (CRs), debug registers (DRs), model-specific registers (MSRs); specific exceptions; external interrupts; accesses to I/O ports; and fatal exceptions.

10. The method of claim 7 wherein said at least one intercept event is either a processor intercept type or a memory intercept type, and wherein a type of said at least one intercept is specified independently to the virtualizer by said first partition.

11. The method of claim 7 wherein a multi-level intercept system, comprising said virtualizer and said first external monitor, processes both a mid-instruction intercept and an inter-instruction intercept.

12. The method of claim 7 wherein said first partition delivers said at least one intercept to said virtualizer using a synthetic interrupt.

13. A hardware control device comprising means for implementing the elements of claim 7.

14. A machine-readable storage medium comprising computer-readable instructions for processing intercepts for partitions in a virtual machine environment, said virtual machine environment comprising a virtualizer and at least one partition, said computer-readable instructions comprising instructions for:

intercepting, by the virtualizer, at least one intercept event received from the partition;

forwarding, by the virtualizer, the at least one intercept event to an external monitor executing within the partition;

suspending on an instruction boundary immediately before the at least one intercept event, by the external monitor, a virtual processor of the virtualizer corresponding to the partition, the virtual processor comprising an abstraction to at least one processor of a physical machine on which the virtual machine environment executes, the virtual processor existing within the virtualizer;

executing, by the external monitor, the at least one intercept event;

modifying, by the external monitor, a state of the virtual processor, the modified state corresponding to the at least one intercept event having been executed; and resuming, by the external monitor, the virtual processor.

15. The machine-readable storage medium of claim 14 further comprising instructions for resolving a default intercept by said virtualizer without forwarding said first intercept event to said first external monitor.

16. The machine-readable storage medium of claim 14 wherein said at least one intercept event is an event from among the following group of events: reads; writes; locked read/modify/write logical operations AND, OR, or XOR; locked read/modify/write arithmetic operations ADD or SUB; locked compare operations XCHG and CMPXCHG; HLT, PAUSE, or CPUID instructions; accesses to control registers (CRs), debug registers (DRs), model-specific registers (MSRs); specific exceptions; external interrupts; accesses to I/O ports; and fatal exceptions.

17. The machine-readable storage medium of claim 14 wherein said at least one intercept event is either a processor intercept type or a memory intercept type, and wherein a type of said at least one intercept is specified independently to the virtualizer by said first partition.

18. The machine-readable storage medium of claim 14 further comprising instructions for processing both a mid-instruction intercept and an inter-instruction intercept by a multi-level intercept system, comprising said virtualizer and said first external monitor.

19. The machine-readable storage medium of claim 14 further comprising instructions for delivering said at least one intercept to said virtualizer using a synthetic interrupt by said first partition.

* * * * *